United States Patent [19]
Wier

[11] Patent Number: 5,871,235
[45] Date of Patent: Feb. 16, 1999

[54] LINEAR ACTUATOR FOR A VECHICLE OCCUPANT RESTRAINT SYSTEM

[75] Inventor: Franz Wier, Göggingen, Germany

[73] Assignee: TRW Occupant Restraint Systems GmbH, Alfdorf, Germany

[21] Appl. No.: 852,204

[22] Filed: May 6, 1997

[30] Foreign Application Priority Data

May 6, 1996 [DE] Germany ............... 296 08 210 U

[51] Int. Cl.[6] .................................................. B60R 22/28
[52] U.S. Cl. ........................... 280/806; 188/67; 297/480
[58] Field of Search .............................. 280/805, 806; 297/480; 188/67, 129, 371, 381

[56] References Cited

U.S. PATENT DOCUMENTS

| | | | |
|---|---|---|---|
| 3,696,891 | 10/1972 | Poe ..................................... | 188/129 X |
| 4,237,690 | 12/1980 | Tsuge et al. . | |
| 4,288,098 | 9/1981 | Tsuge et al. . | |
| 4,458,921 | 7/1984 | Chiba et al. ............................ | 280/806 |
| 5,340,152 | 8/1994 | Föhl ..................................... | 188/371 X |
| 5,568,940 | 10/1996 | Lane, Jr. ................................ | 297/480 X |

FOREIGN PATENT DOCUMENTS

| | | |
|---|---|---|
| 2349891 | 4/1975 | Germany . |
| 57113156 | 12/1980 | Japan . |
| 4131558 | 12/1992 | Japan . |
| 61202 | 1/1994 | Japan . |
| 640310 | 2/1994 | Japan . |
| 6344863 | 12/1994 | Japan . |

*Primary Examiner*—Peter R. Brown
*Attorney, Agent, or Firm*—Tarolli, Sundheim, Covell, Tummino & Szabo

[57] ABSTRACT

A linear actuator for a vehicle occupant restraint system is provided, which comprises a cylinder and a pulling element connected to the cylinder by means of a holding part. The linear actuator further comprises a piston which is shiftable within the cylinder and has a locking part. The locking part including a sealing part coaxial with to the locking part and a conical outer section. The conical outer section has an axial end at a side facing the sealing part and is provided with a peripheral groove at this axial end. Still further, the linear actuator comprises a plurality of locking bodies shiftably arranged between the conical outer section of the locking part and the inner wall of the cylinder.

13 Claims, 3 Drawing Sheets

LINEAR ACTUATOR FOR A VECHICLE OCCUPANT RESTRAINT SYSTEM

TECHNICAL FIELD OF THE INVENTION

The invention relates to a linear actuator for a vehicle occupant restraint system.

BACKGROUND OF THE INVENTION

A conventional linear actuator for a vehicle occupant restraint system comprises a cylinder, a piston shiftable therein and consisting of a locking part including a conical outer section and a sealing part coaxial with said locking part, and further a plurality of locking bodies shiftably arranged between said conical outer section of said locking part and the inner wall of said cylinder and a pulling element connected to said piston by means of a holding part.

Such a linear actuator serves to convert the energy of a highly pressurized gas into a tensioning stroke which may be used to eliminate the slack of a seat belt system by, for example, rotating the belt reel of a belt retractor in the coiling direction or by suitably displacing the buckle of a seat belt.

BRIEF DESCRIPTION OF THE INVENTION

The invention provides a linear actuator which features a particularly short overall length and which can be mounted particularly simple. For this purpose, a linear actuator for a vehicle occupant restraint system is provided, which comprises a cylinder and a pulling element connected to the cylinder by means of a holding part. The linear actuator further comprises a piston which is shiftable within the cylinder and has a locking part. The locking part includes a sealing part coaxial with the locking part and a conical outer section. The conical outer section has an axial end at a side facing the sealing part and is provided with a peripheral groove at this axial end. Still further, the linear actuator comprises a plurality of locking bodies shiftably arranged between the conical outer section of the locking part and the inner wall of the cylinder. Due to this configuration two arrangements of the locking bodies relative to the locking part are possible: a fitting position in the peripheral groove in which the locking bodies do not engage the inner wall of the cylinder and an operative position in which the locking bodies are in contact with the inner wall of the cylinder. In the fitting position the piston is shiftable in both directions along the longitudinal axis of the cylinder, this being especially of advantage for fitting. By contrast, in the operative position the piston is movable only in one direction in the interior of the cylinder.

It is preferably provided for that the sealing part includes a supporting lip for the locking bodies at its axial end facing the conical outer section and that at the locking part or at the holding part a cylindrical outer section is formed on which the sealing part is movable between a fitting position spaced in the axial direction from the conical outer section and an operative position approached to the conical section. Due to this configuration the piston can be translated by particularly simple means from the fitting position into the operative position. When the sealing part is located in the fitting position, the locking bodies are reliably held in the peripheral groove by the supporting lip of the sealing part. When the sealing part is moved from the fitting position into the operative position the supporting lip forces the locking bodies from the peripheral groove into a position on the conical section in which they come into contact with the inner wall of the cylinder, the linear actuator then being ready to function.

According to a further embodiment of the invention it is provided that said locking part is slipped onto said holding part, whereby said holding part is arranged in the interior of said locking part. This results in a particularly short overall length of the linear actuator since the pulling element is connected to the piston within the length required overall in any case for the piston.

It is preferably provided for that the holding part features a conical section, this resulting in a particularly uniform transfer of force between the piston and the pulling element and thus in a particularly high strength of the connection between the piston and the pulling element.

In accordance with a preferred embodiment it is provided for that the locking part is a cold extruded part, thus permitting particularly favorable manufacture of the locking part, for example, on the basis of a hollow cylindrical tubing section, and the work hardening of the locking part occurring during cold extrusion resulting in a particularly high strength of the locking part which may also be made of a non-tempered metal.

Details of the invention are evident from the sub-claims.

BRIEF DESCRIPTION OF THE DRAWINGS

The invention will now be described with reference to the attached drawing in which.

DETAILED DESCRIPTION OF THE INVENTION

Figure 1:
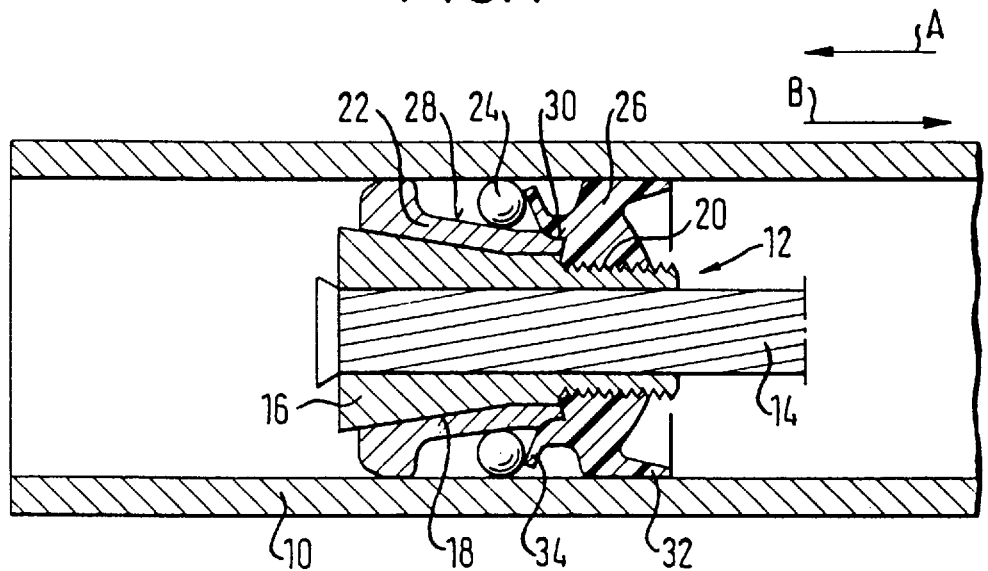
FIG. 1 is a schematic discontinued cross-section through a linear actuator in accordance with the invention as a first embodiment in a functioning position.
Figure 2:
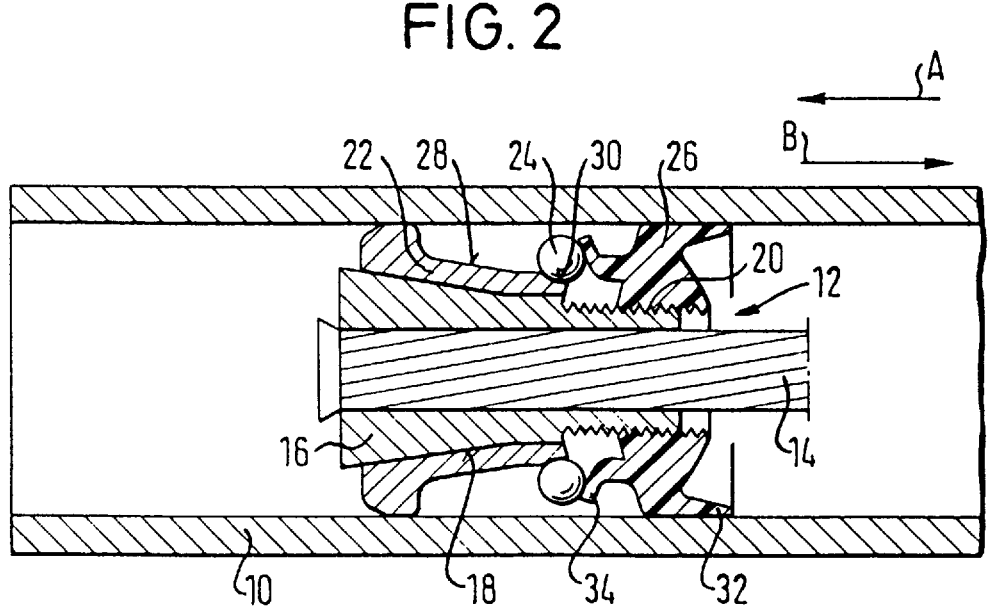
FIG. 2 shows the linear actuator of FIG. 1 in a fitting position.

In the FIGS. 1 and 2 a first embodiment of a linear actuator in accordance with the invention is illustrated. This linear actuator comprises substantially a cylinder 10, in the interior of which a piston 12 is shiftably arranged which is connected to a pulling element 14. On activation of the linear actuator the end of the piston, shown on the right in FIGS. 1 and 2, is impacted by a pressurized gas so that the piston 12 moves in the direction of the arrow A. This movement translated to the pulling element 14 may be employed to eliminate the slack in a seat belt system, by for instance the belt reel of the belt retractor being rotated in the coiling direction or by a fitting part of the seat belt system being moved in a suitable direction relative to other parts.

In the embodiment illustrated in FIGS. 1 and 2 the pulling element 14 is configured as a cable, at the end of which assigned to the piston 12 a holding part or holding element for the piston 12 is provided which in the embodiment illustrated is designed as a preform 16 crimped onto the cable. This preform 16 comprises a conical section 18 and a projection having a cylindrical outer surface 20, a thread being formed on the latter.

The piston 12 consists of a locking part 22, a plurality of locking bodies 24 and a sealing part 26. In the embodiment shown the locking bodies 24 are formed as balls which are movable on a conical outer section 28 of the locking part 22 between a starting position shown in FIG. 1 and a locking position in which they are wedged between the locking part 22 and the inner wall of the cylinder 10, whereby a movement of the piston 12 in the direction of the arrow B is prevented or retarding with energy conversion. At its axial end facing the sealing part the locking part 22 is provided with a peripheral groove 30.

The sealing part 26 includes a sealing lip 32 in contact with the inner wall of the cylinder 10 and a supporting lip 34. The sealing part 26 is screwable on the projection 20 between a fitting position illustrated in FIG. 2 and a functioning position illustrated in FIG. 1. In the fitting position the supporting lip 34 holds the locking bodies 24 in the peripheral groove 30 so that the locking bodies 24 do not engage the inner wall of the cylinder 10. In this condition the piston 10 is movable both in the direction of the arrow A and in the direction of the arrow B in the cylinder which constitutes a major advantage as regards freedom for fitting the linear actuator. When the sealing part 26 is screwed from the fitting position in the direction of the functioning position the locking bodies 24, by the supporting lip 34, are forced out from the peripheral groove 30 and forced onto the conical outer section 28 of the locking part 22 until they come into contact with the inner wall of the cylinder 10, the linear actuator then being ready to function, i.e. when the piston 12 is impacted by the pressurized gas it is able to move in the direction of the arrow A unhampered by the locking bodies 24, whereas a movement of the piston 12 in the direction of the arrow B is counteracted by the locking bodies 24. In translation of the sealing part 26 from the fitting position into the functioning position a deformation of the supporting lip 34 materializes, as a result of which the locking bodies reliably held in the peripheral groove 30 in the fitting position of the sealing part 26 are forced over the shoulder between the peripheral groove 30 and the conical outer section 28.

As a result of the design of the linear actuator in accordance with the invention a series of advantages is achieved. Since the locking bodies 24 can be retained in a fitting position spaced away from the inner wall of the cylinder 10, greater freedom is provided in fitting the linear actuator, since in the fitting position the piston 12 can be moved in both the direction of the arrow A and in the direction of the arrow B in the cylinder, this constituting a substantial advantage over prior art linear actuators in which the piston can be moved in the cylinder in one direction only, namely in the direction of the arrow A. Due to the nested configuration, i.e. the arrangement of the complete piston on the holding part of the cable, a particularly short overall length is achieved. By suitably selecting the material for the piston 12 in keeping with the requirements a low weight is achieved all-in-all. The sealing part 26, which is exposed to no high surface pressures, may be made of a plastics material, whilst the locking part 22 exposed to high point-concentrated loads is made of metal. By means of the conical section 18 high forces effective between the cable 14 and the piston 12 result in a clamping effect on the preform 16 which can thus be dimensioned relatively lightweight, it being even possible to use a preform 16 of aluminum. Furthermore, due to the favorable transfer of force between the piston and the cable 14 a lightweight dimensioned locking part 22 may be employed. Due to the favorable design of the locking part 16 void of any undercuts it is additionally possible to manufacture this as a cold extruded part. Since the cold working of the material occurring in cold extrusion adds to the strength of the locking part 22 it is thus possible to make use of a locking part made of a non-tempered metal.

Figure 3:
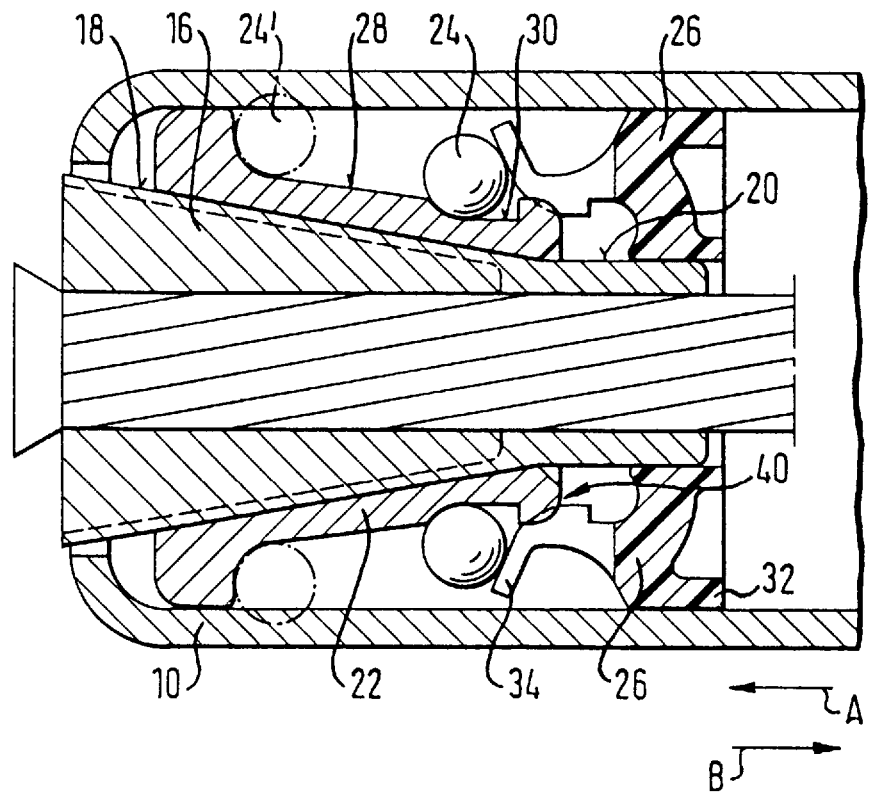
FIG. 3 shows a linear actuator in accordance with the invention as a further variant of the linear actuator of FIGS. 1 and 2 in a fitting position.

In FIG. 3 a variant of the embodiment of a linear actuator in accordance with the invention illustrated in FIGS. 1 and 2 is shown. Like reference numerals are used to identify like elements already known from FIGS. 1 and 2 and as regards the function of these elements reference is made to the explanations regarding FIGS. 1 and 2.

The difference between the variant illustrated in FIG. 3 and the embodiment shown in FIGS. 1 and 2 is that in the case of the linear actuator shown in FIG. 3 a cylindrical outer surface 20 of the projection of the preform 16 is executed plain, i.e. without a thread and that a snap-lock connector 40 is provided with which the sealing part 26 is lockable in the operative position on the locking part 22. The sealing part 26 is press-fit on the cylindrical outer surface 20 of the projection so that it is reliably held in the fitting position shown in FIG. 3. To translate the sealing part 26 from the fitting position into the operative position the sealing part 26 merely needs to be shifted in the direction of the conical outer section 28 until the snap lock 40 latches in place. The splaying of the supporting lip 34 resulting during latching of the snap lock 40 facilitates translating the locking bodies 24 out of the peripheral groove 30 onto the conical outer section 28. Further, locking bodies 24 are illustrated in FIG. 3 which are in a position in which they counteract a movement of the piston 12 in the direction of the arrow B.

The advantages attainable with this variant substantially correspond to those of the embodiment according to FIGS. 1 and 2. In addition, the sealing part 26 permits particularly facilitated translation from the fitting position into the functioning position by, for instance, the piston being pulled by means of the pulling element 14 to the right, with reference to FIG. 3, up to the corresponding end face of the cylinder 10 so that the locking part 22 is forced into the sealing part 26, this being impossible with prior art linear actuators since the locking bodies 24 counteract such a movement of the piston 12.

Figure 4:
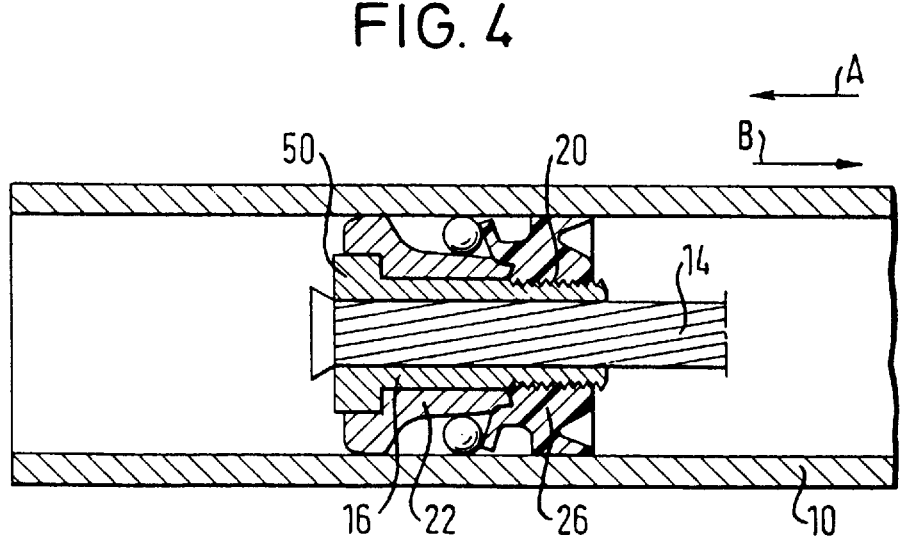
FIG. 4 shows a linear actuator in accordance with the invention as a further variant of the linear actuator of FIGS. 1 and 2 in a functioning position.

In FIG. 4 a further variant of the embodiment of a linear actuator in accordance with the invention illustrated in FIGS. 1 and 2 is shown, the difference as regards the embodiment according to FIGS. 1 and 2 being that the holding part 16 includes a flange-like end section 50 received in a complementary recess in the interior of the locking part 22. In this variant the force between the piston 12 and the cable 14 is transferred by the contact surface extending perpendicular to the direction of force transfer between the end section 50 and the locking part 22, thus avoiding force components which tend to splay the locking part 22.

Figure 5:
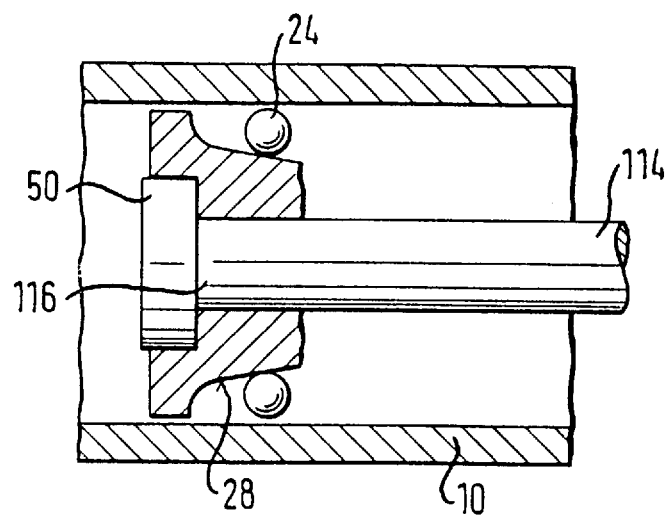
FIG. 5 shows a second embodiment of a linear actuator in accordance with the invention.

In FIG. 5 a second embodiment of a linear actuator in accordance with the invention is schematically illustrated. Here, the difference to the embodiment according to FIGS. 1 and 2 is that the pulling element is configured as a solid pull bar 114 at the one end of which the holding part 116 is integrally formed. Employing a solid pull bar instead of a pull cable is both possible and to advantage when the movement of the piston is able to be transferred without deflection.

Due to the high strength of a pull bar the weight as a whole is reduced.

Figure 6:
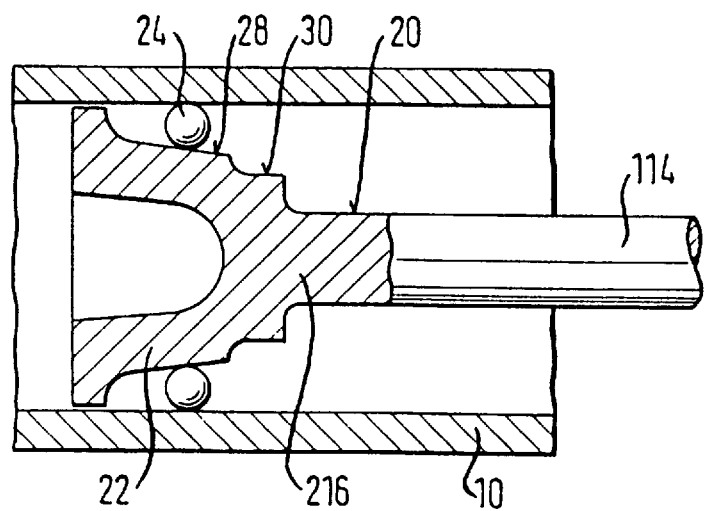
FIG. 6 shows a third embodiment of a linear actuator in accordance with the invention.

In FIG. 6 a third embodiment of a linear actuator in accordance with the invention is illustrated. Here too in this embodiment, a solid pull bar 114 is employed as the pulling element, the holding part 216 of which is integrally connected to the locking part 22 of the piston 12. Due to the direct flow of force between the piston 12 and the pull bar 114 a particularly low weight is achieved. In addition, the cold working of the material resulting during manufacture of the pull bar together with the locking part can be made use of to advantage.

I claim:

1. A linear actuator for a vehicle occupant restraint system, comprising a cylinder, a pulling element connected to said cylinder by means of a holding part, a piston which is shiftable within said cylinder and has a locking part, said locking part including a sealing part coaxial with said locking part and a conical outer section, said conical outer section having an axial end at a side facing said sealing part and being provided with a peripheral groove at said axial end, and further comprising a plurality of locking bodies shiftably arranged between said conical outer section of said locking part and the inner wall of said cylinder, said sealing part being movable between a fitting position in which said locking bodies are held in said peripheral groove by said sealing part, and an operative position in which said locking are disengaged from said peripheral groove and placed in an operative state by said sealing part, said locking bodies, in said operative state, being adapted to be wedged between said locking part and said cylinder.

2. The linear actuator of claim 1, wherein said sealing part has an axial end facing said conical outer section and is provided with a supporting lip for said locking bodies at said axial end, and wherein said locking part has an axial end facing said sealing part and is provided at said axial end with a projection having a cylindrical outer section on which said sealing part is movable between a fitting position spaced in an axial direction from said conical outer section and said operative position approached to said conical section.

3. The linear actuator of claim 2, wherein said cylindrical outer section of said holding part is provided with a thread on which said sealing part is screwable.

4. The linear actuator of claim 2, wherein said sealing part is arranged on said cylindrical outer section of said holding part with a press fit.

5. The linear actuator of claim 4, wherein between said sealing part and said locking part a snap lock connector is provided with which said sealing part is lockable in the operative position on said locking part.

6. The linear actuator of claim 1, wherein said holding part is provided with a cylindrical outer section on which said sealing part is movable between said fitting position spaced in an axial direction from said conical outer section and said operative position adjacent said conical outer section.

7. The linear actuator of claim 1, wherein said locking part is slipped onto said holding part, whereby said holding part is arranged in the interior of said locking part.

8. The linear actuator of claim 7, wherein said pulling element is a pull cable and said holding part is a preform crimped onto said cable.

9. The linear actuator of claim 7, wherein said pulling element is a pull bar and wherein said holding part is configured integral with said pull bar.

10. The linear actuator of claim 7, wherein said holding part comprises a conical section.

11. The linear actuator of claim 7, wherein said holding part comprises a flange-like end section.

12. The linear actuator of claim 1, wherein said locking part is a cold extruded part.

13. The linear actuator of claim 12, said holding part is a preform crimped onto said cable, said crimped preform being made of aluminum.

* * * * *

UNITED STATES PATENT AND TRADEMARK OFFICE
CERTIFICATE OF CORRECTION

PATENT NO. : 5,871,235
DATED : February 16, 1999
INVENTOR(S) : Franz Wier

It is certified that error appears in the above-indentified patent and that said Letters Patent is hereby corrected as shown below:

Title page, item [54] and col. 1, line 1, change "VECHICLE" to --VEHICLE--

Column 5, page 7, line 25, after "locking" insert --bodies--

Column 5, page 7, line 38, change "approached" to --adjacent--

Signed and Sealed this

Twenty-sixth Day of December, 2000

Attest:

Q. TODD DICKINSON

Attesting Officer

Director of Patents and Trademarks